United States Patent
Takikawa et al.

(10) Patent No.: US 10,773,379 B2
(45) Date of Patent: Sep. 15, 2020

(54) JOINT STRUCTURE FOR ROBOT INCLUDING MOTOR AND SPEED REDUCER

(71) Applicant: FANUC CORPORATION, Yamanashi (JP)

(72) Inventors: Ryuji Takikawa, Yamanashi (JP); Satoshi Kinoshita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 249 days.

(21) Appl. No.: 15/077,910

(22) Filed: Mar. 23, 2016

(65) Prior Publication Data

US 2016/0297066 A1    Oct. 13, 2016

(30) Foreign Application Priority Data

Apr. 9, 2015    (JP) .................................. 2015-080315

(51) Int. Cl.
*B25J 9/10* (2006.01)
*B25J 17/00* (2006.01)
*B25J 9/00* (2006.01)

(52) U.S. Cl.
CPC .............. *B25J 9/102* (2013.01); *B25J 17/00* (2013.01); *B25J 9/0009* (2013.01)

(58) Field of Classification Search
CPC ........ F16H 9/102; F16H 9/126; F16H 9/0009; F16H 9/106; F16H 17/00; F16H 17/0241
USPC ...................... 74/490.05, 490.06; 901/25, 28
See application file for complete search history.

(56) References Cited

U.S. PATENT DOCUMENTS

| | | | | |
|---|---|---|---|---|
| 4,507,043 A * | 3/1985 | Flatau | .................. | B23Q 1/5481 |
| | | | | 414/719 |
| 7,909,722 B2* | 3/2011 | Hibino | ..................... | B25J 9/102 |
| | | | | 475/168 |
| 8,413,540 B2* | 4/2013 | Long | ....................... | B25J 9/102 |
| | | | | 74/421 A |
| 8,435,149 B2* | 5/2013 | Koyama | ................ | B25J 9/102 |
| | | | | 475/162 |
| 2009/0019961 A1 | 1/2009 | Kobayashi | | |
| 2013/0047769 A1* | 2/2013 | Long | ....................... | B25J 9/102 |
| | | | | 74/490.01 |

(Continued)

FOREIGN PATENT DOCUMENTS

| | | |
|---|---|---|
| CN | 202781188 U | 3/2013 |
| CN | 203471790 U | 3/2014 |

(Continued)

*Primary Examiner* — Bobby Rushing, Jr
(74) *Attorney, Agent, or Firm* — Hauptman Ham, LLP

(57) ABSTRACT

A joint structure for a robot of the present invention includes: a first member; a speed reducer coupled to one surface of a wall portion of the first member; a motor located at a side opposite to the one surface of the wall portion of the first member; a first gear attached to a shaft of the motor; a second gear attached to a shaft of an input unit of the speed reducer and intermeshing with the first gear; and a second member attached to an output unit of the speed reducer. The diameter of the second gear is larger than a coupling unit that couples to the first member. The first member is provided with a gear accommodating portion that accommodates the first and second gear, a part of the gear accommodating portion which covers at least the second gear is removable with respect to the first member.

7 Claims, 5 Drawing Sheets

(56) References Cited

U.S. PATENT DOCUMENTS

2014/0251058 A1\* 9/2014 Mihara .................. B25J 17/02
74/490.06

FOREIGN PATENT DOCUMENTS

| CN | 103978495 A | 8/2014 |
|---|---|---|
| JP | 1-252387 A | 10/1989 |
| JP | 8-155881 A | 6/1996 |
| JP | 2001-353684 A | 12/2001 |
| WO | 2006115257 A1 | 11/2006 |

\* cited by examiner ically, in FIG. 4, each form of the output unit, the input unit, and the fixing unit of the speed reducer 2 is omitted.

JOINT STRUCTURE FOR ROBOT INCLUDING MOTOR AND SPEED REDUCER

RELATED APPLICATIONS

The present application claims priority to Japanese Patent Application Number 2015-080315, filed Apr. 9, 2015, the disclosure of which is hereby incorporated by reference herein in its entirety.

BACKGROUND OF THE INVENTION

1. Field of the Invention

The present invention relates to a joint structure for a robot, and more particularly to a joint structure for a robot which includes a motor and a speed reducer.

2. Description of the Related Art

A multi-joint manipulator is known as an industrial robot. The robot includes multiple joints such as a shoulder joint or an elbow joint, and at each joint, a first member and a second member are coupled to each other via a rotational driving mechanism. For the rotational driving mechanism, use is made of a motor, a speed reducer, gears, and so forth.

FIG. 4 is a sectional view schematically illustrating a prior art joint structure for a robot. Referring to FIG. 4, a second member 3 is coupled to a first member 1 via a speed reducer 2. For the speed reducer 2, use is made of a planetary gear speed reducer, a wave gear device or the like. Such speed reducer 2 is configured of an output unit, an input unit, and a fixing unit, but in FIG. 4, each form of the output unit, the input unit, and the fixing unit of the speed reducer 2 is omitted.

As illustrated in FIG. 4, the speed reducer 2 is coupled to one surface of a wall portion 1b of the first member 1 by bolts 6, and a motor 4 is located in a space 1a at a side opposite to the one surface. A first gear 5 is attached to a shaft of the motor 4. Further, the second member 3 is coupled to the output unit of the speed reducer 2. A second gear 7 is attached to a shaft of the input unit of the speed reducer 2.

Further, the wall portion 1b of the first member 1 is formed with a recess 8 that accommodates the second gear 7 of the speed reducer 2. The recess 8 is formed by recessing the wall portion 1b. An opening 8a of the recess 8 is formed so as to allow the second gear 7 to pass through. Further, on the bottom of the recess 8 of the first member 1, a communication hole 9 is formed that allows the interior of the recess 8 to be communicated with the space 1a. The shaft of the motor 4 is passed through the communication hole 9, and the motor 4 is supported by and fixed to a periphery of the communication hole 9 so as to close the communication hole 9.

As illustrated in FIG. 4, when the speed reducer 2 is coupled to the wall portion 1b of the first member 1, the second gear 7 is disposed in the recess 8 of the first member 1 so as to intermesh with the first gear 5. The rotational driving force of the motor 4 is amplified by the first gear 5 and the second gear 7 and then inputted to the speed reducer 2, and the inputted rotational driving force is further amplified in the interior of the speed reducer 2, whereby the second member 3 is swung about a predetermined axis of rotation.

Further, with the above-described structure, when the speed reducer 2 is coupled to the wall portion 1b of the first member 1 so as to locate the second gear 7 in the recess 8, the speed reducer 2 closes the opening 8a of the recess 8. Hence, before the speed reducer 2 is coupled to the first member 1, it is preferably that the second gear 7 be preattached to the input unit of the speed reducer 2. Thus, may the second gear 7 be changed to a gear having a larger diameter in order to increase the speed reduction ratio, a problem would occur in which the second gear 7 attached to the speed reducer 2 interferes with the wall portion 1b of the first member 1 when the speed reducer 2 is coupled to the first member 1. Further, in order to prevent the problem, if the opening 8a of the recess 8 in the first member 1 is made larger than the diameter D of a part 2a (hereinafter, referred to as coupling unit) of the speed reducer 2 which allows the speed reducer to be coupled to the first member 1, it would not possible to couple the speed reducer 2 to the first member 1. Therefore, when the speed reduction ratio is changed, it is not possible to make the outer diameter of the second gear 7 larger than the diameter D of the coupling unit 2a of the speed reducer 2.

As the result, in the structure illustrated in FIG. 4, there is a limit for setting a larger speed reduction ratio by increasing the gear diameter of the input unit of the speed reducer 2 for the purpose of increasing the torque for driving the second member 3.

In contrast, Japanese Laid-open Patent Publication No. H08-155881 discloses a structure in which a speed reducer is coupled to an arm portion in which a motor is accommodated, wherein a wall portion of the arm portion to which the speed reducer is coupled is configured to be splittable so as to make it possible to use a gear having a larger diameter than the body of the speed reducer. FIG. 5 is a schematic sectional view of the structure. In FIG. 5, components similar to those illustrated in FIG. 4 are denoted by the same reference numerals.

In the structure illustrated in FIG. 5, a coupling plate 10 for coupling a first member 1 and a speed reducer 2 to each other is located between the first member 1 and the speed reducer 2. The coupling plate 10 is removably fixed to a wall portion 1b of the first member 1 by bolts 6. Further, the speed reducer 2 is removably fixed by bolts 11 to the coupling plate 10 fixed to the wall portion 1b of the first member 1.

Further, in the structure illustrated in FIG. 5, a driving force for moving the second member 3 with the first member 1 as a datum passes through a power transmission path 12 such as indicated by a broken line arrow in FIG. 5. In other words, the driving force generated from the motor 4 and the gears 5 and 7 is transmitted from the first member 1 to the second member 3 successively via the bolts 6, the coupling plate 10, the bolts 11, and the speed reducer 2. Thus, in the case of the structure illustrated in FIG. 5, bolts capable of withstanding power transmission are used for the bolts 6 and 11.

According to the structure illustrated in FIG. 5, the first member 1 and the speed reducer 2 are coupled to each other via the coupling plate 10, and thus the opening 8a of the recess 8 of the first member 1 can be widened to be larger than the diameter D of the coupling unit 2a of the speed reducer 2. In this manner, it is possible to increase the outer diameter of the second gear 7 to be larger than the diameter D of the coupling unit 2a of the speed reducer 2.

However, in the structure illustrated in FIG. 5, the power transmission path 12 between the first member 1 and the speed reducer 2 is cut by the coupling plate 10 which couples the first member 1 and the speed reducer 2 to each other. Thus, not only the bolts 6 and 11 but also the coupling plate 10 is preferred to have a strength capable of withstanding power transmission. As a result, a problem arises in which the component cost and the number of man-hours are increased.

Further, without making the diameter of the second gear 7 smaller than the part to which the coupling plate 10 of the first member 1 is coupled, i.e., the periphery of the opening 8a of the recess 8 as illustrated in FIG. 5, it is not possible to couple the plate 10 to the periphery. As such, in the case of the structure illustrated in FIG. 5, a new problem arises in which while the diameter of the second gear 7 can be increased to be larger than the diameter D of the coupling unit 2a of the speed reducer 2, the increase in the gear diameter is limited by the size of the opening 8a of the recess 8 in the first member 1

Further, there is also a problem in which the second gear 7 may not be easily exchanged since it is preferable to remove from the first member 1 the relatively heavy speed reducer and the second member 3 attached to the speed reducer when the second gear 7 is exchanged for maintenance.

SUMMARY OF THE INVENTION

The present invention provides a joint structure for a robot in which the diameter of a gear of an input unit of a speed reducer can be freely set without increasing the component cost and the number of man-hours, and an exchange of the gear is facilitated.

According to a first aspect of the present invention, there is provided a joint structure for a robot, which includes:
a first member;
a speed reducer coupled to one surface of a wall portion of the first member, a shaft of an input unit of the speed reducer being passed through the wall portion;
a motor located at a side of the wall portion opposite to the one surface;
a first gear attached to a shaft of the motor;
a second gear attached to the shaft of the input unit and intermeshing with the first gear; and
a second member attached to an output unit of the speed reducer,
wherein
the second gear has a diameter larger than a diameter of a coupling unit of the speed reducer which couples to the first member,
the first member is provided with a gear accommodating portion that accommodates the first gear and the second gear which intermesh with each other, and
a part of the gear accommodating portion which covers at least the second gear is attachable and removable with respect to the first member.

According to a second aspect of the present invention, there is provided the joint structure for a robot according to the first aspect, in which: the gear accommodating portion is formed by a cover member covering the first gear and the second gear which intermesh with each other; the cover member is removably fixed to the first member; and the motor is held at the cover member.

According to a third aspect of the present invention, there is provided the joint structure for a robot according to the first aspect, in which the gear accommodating portion is formed integrally with the first member and includes a motor holding portion that accommodates the first gear and holds the motor, and a cover member that is removably fixed to the first member and covers the second gear.

These objects, features, and advantages, as well as other objects, features, and advantages, of the present invention will more apparent from a detailed description of exemplary embodiments of the present invention illustrated in the accompanying drawings.

DETAILED DESCRIPTION

Figure 4:
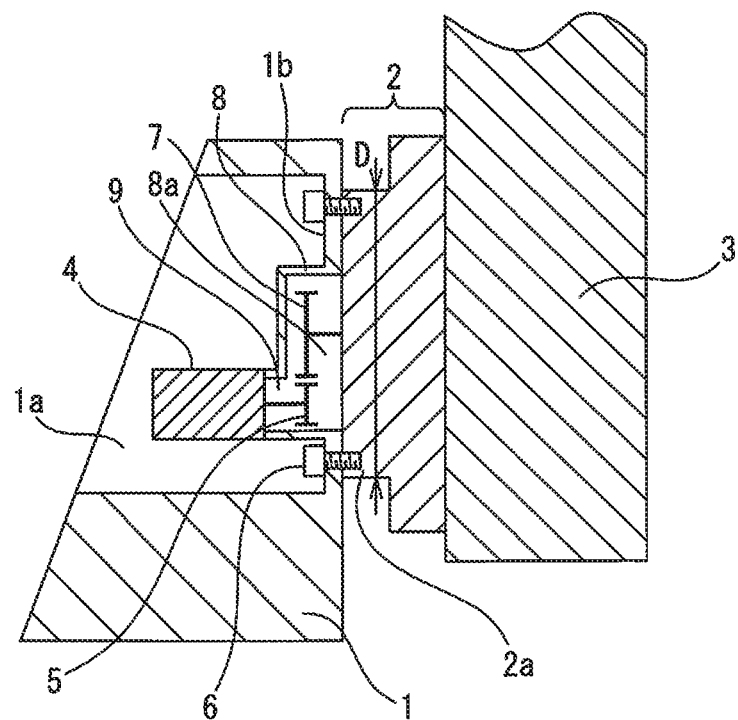
FIG. 4 is a sectional view schematically illustrating a prior art joint structure for a robot.

Description will now be made of embodiments of the present invention with reference to the drawings. In the drawings, like members are denoted by like reference numerals. In order to facilitate understanding, the scale of the drawings is changed arbitrarily. Further, in each embodiment, components same as those of the prior art illustrated in FIGS. 4 and 5 will be described by assigning the same reference numerals thereto.

First Embodiment

Figure 1:
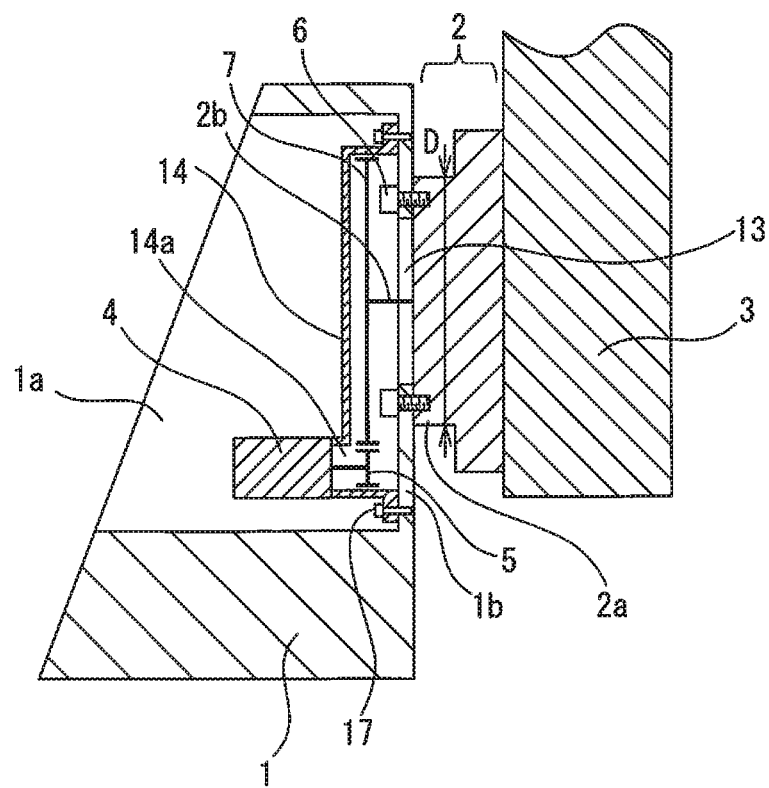
FIG. 1 is a sectional view schematically illustrating a joint structure for a robot according to a first embodiment.

FIG. 1 is a sectional view schematically illustrating a joint structure for a joint structure for a robot according to a first embodiment.

The joint structure for a robot according to the first embodiment includes a first member 1, a speed reducer 2 coupled to one surface of a wall portion 1b of the first member 1, a second member 3 attached to the speed reducer 2, and a motor 4 located at a side opposite to the one surface of the wall portion 1b of the first member 1, as illustrated in FIG. 1. A first gear 5 is attached to a shaft of the motor 4.

As the speed reducer 2, use may be made of a planetary gear speed reducer, a Cyclo (registered trademark) speed reducer, an RV (registered trademark) speed reducer, a wave gear device, or the like. Such speed reducer 2 is configured of an output unit, an input unit, and a fixing unit, but in FIG. 1, the form of each of the output unit, the input unit, and the fixing unit of the speed reducer 2 is omitted.

The speed reducer 2 is coupled to one surface of the wall portion 1b of the first member 1 by bolts 6. A second member 3 is attached to the output unit of the speed reducer 2. To a shaft 2b of the input unit of the speed reducer 2 is attached a second gear 7 that intermeshes with the first gear 5 of the motor 4.

As illustrated in FIG. 1, in the wall portion 1b of the first member 1, there is formed an opening portion 13 that allows the shaft 2b of the speed reducer 2 to pass through. The opening portion 13 is smaller than a diameter D of a coupling unit 2a of the speed reducer 2. In this manner, as illustrated in FIG. 1, the opening portion 13 is closed by the speed reducer 2 when the speed reducer 2 is coupled to the wall portion 1b of the first member 1. Further, the second gear 7 is attached to the shaft 2b of the speed reducer 2 from a space 1a of the first member 1 at the side opposite to the speed reducer 2 after the speed reducer 2 is coupled to the wall portion 1b of the first member 1.

In addition, the first member 1 is provided with a gear accommodating portion 14 that accommodates the first gear 5 and the second gear 7.

In the present embodiment, as illustrated in FIG. 1, the gear accommodating portion 14 is formed in the form of a cover member that covers the second gear 7 and the first gear 5 intermeshing therewith. Further, the cover member, which is the gear accommodating portion 14, is removably fixed to the wall portion 1b of the first member 1 by bolts 17 in the space 1a of the first member 1 at the side opposite to the speed reducer 2.

As illustrated in FIG. 1, the gear accommodating portion 14 is formed with an opening portion 14a that allows the shaft of the motor 4 to pass through. The shaft of the motor 4 that is located in the space 1a of the first member 1 at the side opposite to the speed reducer 2 is passed through the opening portion 14a of the gear accommodating portion 14, and the motor 4 is supported by and fixed to a periphery of the opening portion 14a so as to close the opening portion 14a. In other words, in the present embodiment, the periphery of the opening portion 14a of the gear accommodating portion 14 is formed as a motor holding portion.

As illustrated in FIG. 1, when the speed reducer 2 is coupled to the first member 1 and the motor 4 is fixed to the gear accommodating portion 14, the first gear 5 of the motor 4 intermeshes with the second gear 7 of the speed reducer 2. The rotational driving force of the motor 4 is amplified by the first gear 5 and the second gear 7 and then inputted to the speed reducer 2, and the inputted rotational driving power is further amplified in the interior of the speed reducer 2. In this manner, the second member 3 is swung about a predetermined axis of rotation.

According to the present invention, the second gear 7 is accommodated in an enclosed space defined by the gear accommodating portion 14 and the speed reducer 2 that closes the opening portion 13 of the first member 1. In the space 1a of the first member 1 at the side opposite to the speed reducer 2, the gear accommodating portion 14 can be removed from the wall portion 1b of the first member 1. Thus, the second gear 7 of the speed reducer 2 can be removed, with the speed reducer 2 remaining coupled to the first member 1.

Further, in the present embodiment, only a reaction force caused by the rotational driving force of the motor 4 prior to being decelerated by the speed reducer 2 is applied to the gear accommodating portion 14. As such, it is possible to use relatively small fixing bolts for the bolts 17 to tightly secure the gear accommodating portion 14 to the wall portion 1b of the first member 1.

According to the first embodiment described above, after the first member 1 is coupled to the speed reducer 2, the second gear 7 is attached to the shaft 2b of the input unit of the speed reducer 2, and the gear accommodating portion 14 is fixed to the wall portion 1b of the first member 1. Further, after the gear accommodating portion 14 is removed from the wall portion 1b of the first member 1, the second gear 7 can be removed from the shaft 2b of the input unit of the speed reducer 2, with the first member 1 being coupled to the speed reducer 2. In other words, the attaching or removing of the second gear 7 to the shaft 2b of the input unit of the speed reducer 2 can be performed, with the speed reducer 2 being coupled to the first member 1. Thus, regarding the diameter of the second gear 7, it is possible to freely set the diameter of the second gear 7 without taking into account of the diameter D of the coupling unit 2a of the speed reducer 2 which causes the second gear 7 to be coupled to the first member 1 and/or the size of the opening portion 13 that allows the shaft 2b of the input unit of the speed reducer 2 to pass through.

Therefore, when a higher speed reduction ratio is set in order to increase the torque for driving the second member 3, it is possible to use the second gear 7 that has a larger diameter than the opening portion 13 of the first member 1 and the coupling unit 2a of the speed reducer 2 as illustrated in FIG. 1.

Figure 5:
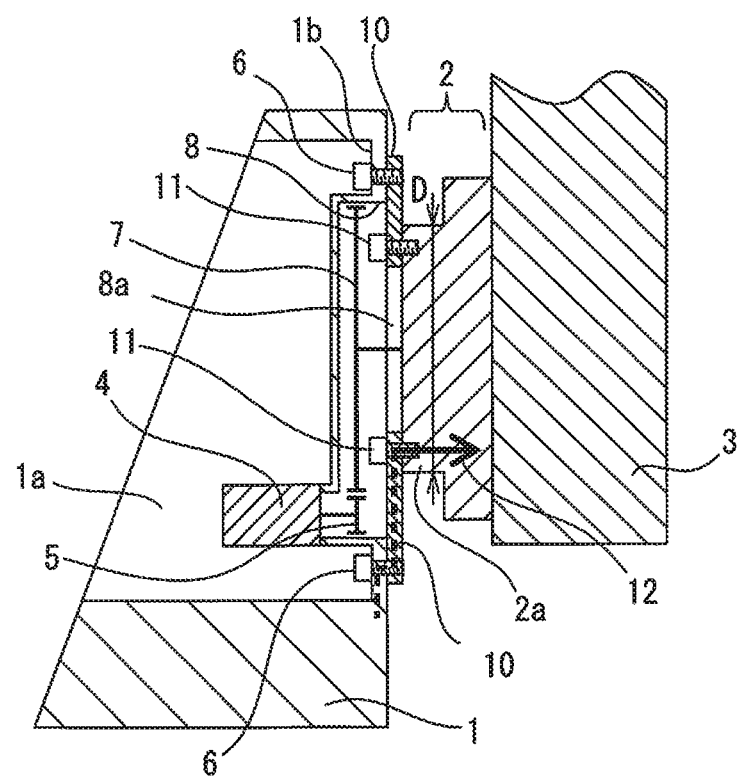
FIG. 5 is a sectional view schematically illustrating another configuration of the prior art joint structure for a robot.

Further, when attempting to achieve the higher speed reduction ratio such as mentioned above, there is no need to provide a coupling plate 10 between the first member 1 and the speed reducer 2 as in the prior art structure illustrated in FIG. 5. In other words, it is possible to use the second gear 7 having a larger diameter than the coupling unit 2a of the speed reducer 2 without cutting the power transmission path between the first member 1 and the speed reducer 2. Further, since the coupling plate 10 and the bolts 11 to tightly secure the coupling plate 10 to the speed reducer 2 are not needed, it is also possible to prevent a problem in which the component cost and the number of man-hours are increased.

In addition, when the second gear 7 is exchanged for maintenance, there is no need to remove from the first member 1 the relatively heavy speed reducer 2 and the second member 3 attached to the speed reducer 2. It is possible to exchange the second gear 7 by removing the gear accommodating portion 14 formed of the relatively light cover member. In other words, the gear of the input unit of the speed reducer can be exchanged without removing the base and the arm which constitute the link of the robot, the speed reducer, and so forth; thus, the maintainability can be improved.

Second Embodiment

A second embodiment will next be described mainly about the differences from the first embodiment described above.

In the above-described first embodiment (FIG. 1), a structure has been illustrated in which: the motor 4 and the gear 7 of the speed reducer 2 are located in the first member 1; the first member 1 is fixed; and the second member 3 is swung about the predetermined axis of rotation. However, in the present invention, since the first member 1 and the second member 3 are related to be relatively moved via the speed reducer 2, the driving source may be located in either the first member 1 or the second member 3. Therefore, in the second embodiment, a structure is illustrated in which the motor 4 and the gear 7 of the speed reducer 2 are located in the second member 3 which serves as a driven member. Further, let it be assumed that the terms "first member" and "second member" may be mutually replaced in the appended claims.

Figure 2:
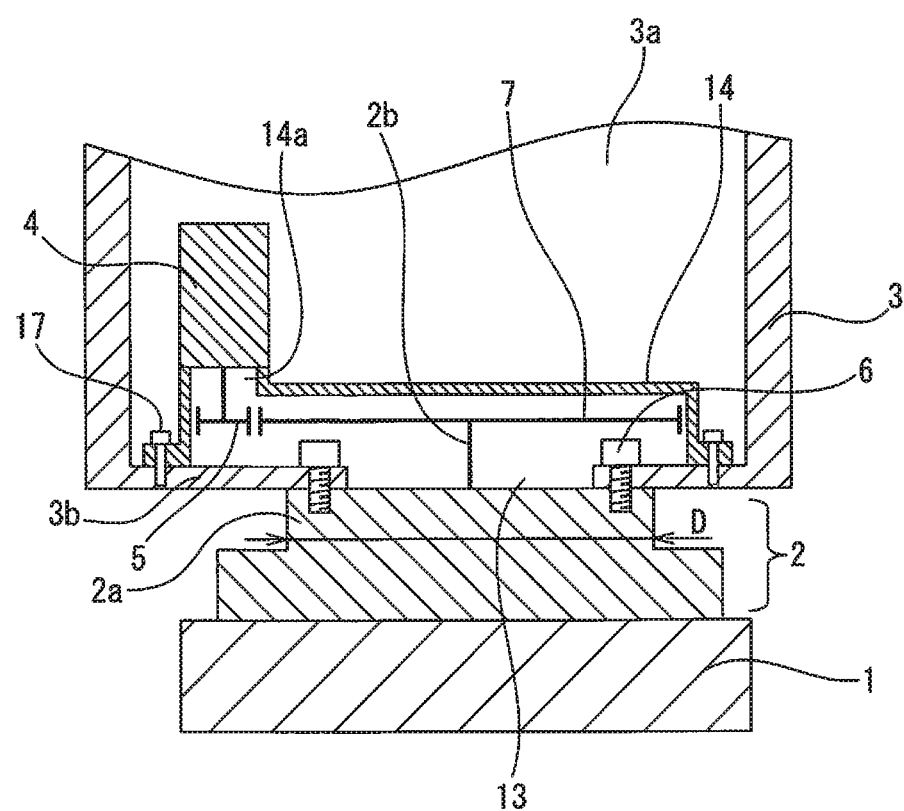
FIG. 2 is a sectional view schematically illustrating a joint structure for a robot according a second embodiment.

FIG. 2 is a sectional view illustrating the joint structure for a robot according to the second embodiment.

As illustrated in FIG. 2, the joint structure for a robot according to the second embodiment includes a first member 1, a speed reducer 2 attached to the first member 1, a second member 3 coupled to the speed reducer 2, and a motor 4 located at a side of the second member 3 opposite to the speed reducer 2. A first gear 5 is attached to a shaft of the motor 4.

The speed reducer 2 is coupled to a wall portion 3b of the second member 3 by bolts 6. The first member 1 is attached to an output unit of the speed reducer 2. Further, as illustrated in FIG. 2, the wall portion 3b of the second member 3 is formed with an opening portion 13 that allows a shaft 2b of the speed reducer 2 to pass through. The opening portion 13 is smaller than the diameter D of a coupling unit 2a of the speed reducer 2. As such, when the speed reducer 2 is coupled to the wall portion 3b of the second member 3 as illustrated in FIG. 2, the opening portion 13 is closed by the speed reducer 2. Further, a second gear 7 is attached to the shaft 2b of the speed reducer 2 from a space 3a at a side of the second member 3 opposite to the speed reducer 2 after the speed reducer 2 is coupled to the wall portion 3b of the second member 3.

Further, the second member 3 is provided with a gear accommodating portion 14 that accommodates the first gear 5 and the second gear 7.

In the present embodiment, as illustrated in FIG. 2, the gear accommodating portion 14 is formed as a cover member that covers the second gear 7 and the first gear 5 intermeshing therewith. Further, the cover member, which is the gear accommodating portion 14, is removably fixed to the wall portion 3b of the second member 3 by bolts 17 in the space 3a at the side of the second member 3 opposite to the speed reducer 2.

The gear accommodating portion 14, as illustrated in FIG. 2, is formed with an opening portion 14a that allows the shaft of the motor 4 to pass through. The shaft of the motor 4 located in the space 3a at the side of the second member 3 opposite to the speed reducer 2 is passed through the opening portion 14a of the gear accommodating portion 14, and the motor 4 is supported by and fixed to the periphery of the opening portion 14a so as to close the opening portion 14a. In other words, as in the first embodiment and also in the second embodiment, the periphery of the opening portion 14a of the gear accommodating portion 14 is formed as a motor holding portion.

As illustrated in FIG. 2, in the configuration in which the speed reducer 2 is coupled to the second member 3 and the motor 4 is fixed to the gear accommodating portion 14, the first gear 5 of the motor 4 intermeshes with the second gear 7 of the speed reducer 2. The rotational driving force of the motor 4 is amplified by the first gear 5 and the second gear 7 and then inputted to the speed reducer 2. The rotational driving force thus inputted is further amplified in the interior of the speed reducer 2 and then transmitted to the first member 1. The first member 1 and the second member 3 are related to be relatively moved via the speed reducer 2, and thus when the first member 1 is fixed, the second member 3 is driven about a predetermined axis of rotation.

According to the present invention, the second gear 7 is accommodated in an enclosed space defined by the gear accommodating portion 14 and the speed reducer 2 that closes the opening portion 13 of the second member 3. In the space 3a at the side of the second member 3 opposite to the speed reducer 2, the gear accommodating portion 14 can be removed from the wall portion 3b of the second member 3. As such, the second gear 7 of the speed reducer 2 can be removed with the speed reducer 2 remaining coupled to the second member 3.

Further, in the present embodiment, only the reaction force caused by the rotational driving force of the motor 4 prior to being decelerated by the speed reducer 2 is applied to the gear accommodating portion 14. As such, relatively small fixing bolts can be used for the bolts 17 to tightly secure the gear accommodating portion 14 to the wall portion 3b of the second member 3.

In the second embodiment described above, too, it is possible to obtain effects similar to those of the first embodiment. In the second embodiment, after the second member 3 is coupled to the speed reducer 2, the second gear 7 is attached to the shaft 2b of the input unit of the speed reducer 2, and the gear accommodating portion 14 is fixed to the wall portion 3b of the second member 3. Further, after the gear accommodating portion 14 is removed from the wall portion 3b of the second member 3, the second gear 7 can be removed from the shaft 2b of the input unit of the speed reducer 2, with the second member 3 being coupled to the speed reducer 2. In other words, it is possible to attach and remove the second gear 7 with the speed reducer 2 being coupled to the second member 3. Thus, the diameter of the second gear 7 can be freely set without taking into account of the diameter D of the coupling unit 2a of the speed reducer 2 which allows the speed reducer 2 to couple to the second member 3 and the size of the opening portion 13 which allows the shaft 2b of the input unit of the speed reducer 2 to pass through. In this manner, it is possible to set a larger speed reduction ratio.

Further, as compared with a structure in which the coupling plate 10 is needed for the coupling unit between the first member 1 and the speed reducer 2 as in the prior art structure illustrated in FIG. 5, the second gear 7 having a larger diameter than the coupling unit 2a of the speed reducer 2 can be used without cutting the power transmission path between the first member 1 and the speed reducer 2. Since the coupling plate 10 is not needed, it is also possible to prevent a problem in which the component cost and the number of man-hours are increased. Further, since the second gear 7 can be exchanged merely by only removing the gear accommodating portion 14 composed of the relatively light cover member, the maintainability is enhanced.

Third Embodiment

A third embodiment will next be described mainly about the differences from the first embodiment described above.

In the first embodiment, the gear accommodating portion 14 is formed as a cover member that covers the first gear 5 and the second gear 7 as illustrated in FIG. 1, and the motor 4 is held by the cover member. However, in the present invention, the gear accommodating portion 14 may be of any configuration provided if it is a structure in which the part of the gear accommodating portion 14 which covers at least the second gear 7 is attachable and removable with respect to the first member 1. As an example of such configuration, the below third embodiment is given.

Figure 3:
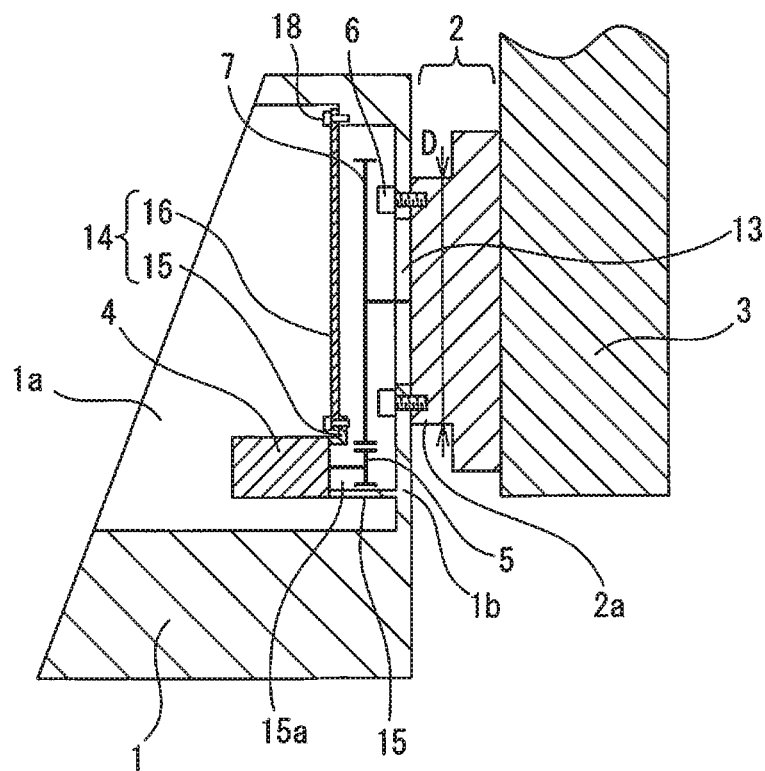
FIG. 3 is a sectional view schematically illustrating a joint structure for a robot according to a third embodiment.

FIG. 3 is a sectional view illustrating a joint structure for a robot according to the third embodiment.

As illustrated in FIG. 3, a first member 1 is provided with a gear accommodating portion 14 that accommodates a first gear 5 and a second gear 7. In the present embodiment, the gear accommodating portion 14 is composed of a motor holding portion 15 that holds a motor 4 and a cover member 16 that covers the second gear 7.

The motor holding portion 15 is molded integrally with the first member 1, and capable of accommodating a first gear 5 of the motor 4. The cover member 16 is tightly secured by bolts 18 to wall portions forming respectively the motor holding portion 15 and the first member 1.

Further, the motor holding portion 15 is formed with an opening portion 15a that allows a shaft of the motor 4 to pass through. The shaft of the motor 4 located in a space 1a at a side of the first member 1 opposite to a speed reducer 2 is passed through the opening portion 15a of the motor holding portion 15, and the motor 4 is supported by and fixed to a periphery of the opening portion 15a so as to close the opening portion 15a. The first gear 5 of the motor 4 fixed to the periphery of the opening portion 15a is surrounded by the wall portion forming the motor holding portion 15.

In the configuration in which the speed reducer 2 is coupled to the first member 1 and the motor 4 is fixed to the motor holding portion 15 as illustrated in FIG. 3, the first gear 5 of the motor 4 intermeshes with the second gear 7 of the speed reducer 2. A rotational driving force of the motor 4 is amplified by the first gear 5 and the second gear 7 and then inputted to the speed reducer 2, and the inputted rotational driving force is further amplified in the interior of the speed reducer 2. In this manner, a second member 3 is swung about a predetermined axis of rotation.

In the present embodiment, since the gear accommodating portion 14 is structured as being divided into the motor holding portion 15 and the cover member 16, the cover member 16 is not affected by a driving force generated from the motor 4. As such, the cover member 16 is merely preferred to have the function to cover the second gear 7, and can be formed in a simple plate-like shape. Further, bolts 18 used to fix the cover portion 16 also do not need to be ones capable of withstand power transmission.

Further, according to the present invention, the second gear 7 is accommodated in a space defined by the gear accommodating portion 14 and the speed reducer 2 closing the opening portion 13 of the first member 1. In the space 1a at the side of the first member 1 opposite to the speed reducer 2, the cover member 16 of the gear accommodating portion 14 is removable. Thus, the second gear 7 of the speed reducer 2 can be removed, with the speed reducer 2 remaining coupled to the first member 1.

In the third embodiment described above, too, it is possible to obtain effects similar to those of the first embodiment. In the third embodiment, after the first member 1 is coupled to the speed reducer 2, the second gear 7 is attached to the shaft 2b of the input unit of the speed reducer 2, and the gear accommodating portion 14 is fixed to a wall portion 1b of the first member 1. Further, after the gear accommodating portion 14 is removed from the wall portion 1b of the first member 1, the second gear 7 can be removed from the shaft 2b of the input unit of the speed reducer 2, with the first member 1 being coupled to the speed reducer 2. In other words, it is possible to attach and remove the second gear 7, with the first member 1 being coupled to the speed reducer 2. Thus, the diameter of the second gear 7 can be freely set without taking into account of the diameter D of the coupling unit 2a of the speed reducer 2 that couples the speed reducer 2 to the first member 1 and the size of the opening portion 13 that allows the shaft 2b of the input unit of the speed reducer 2 to pass through. In this manner, it is possible to set a larger speed reduction ratio.

Further, compared with a structure in which the coupling plate 10 is necessary for the coupling unit between the first member 1 and the speed reducer 2 as in the prior art structure illustrated in FIG. 5, the second gear 7 having a larger diameter than the coupling unit 2a of the speed reducer 2 can be used without cutting the power transmission path between the first member 1 and the speed reducer 2. Since the coupling plate 10 is not required, it is also possible to prevent a problem in which the component cost and the number of man-hours are increased. Further, since the second gear 7 can be exchanged merely by removing the relatively light cover member 16, the maintainability is enhanced.

Further, in the first embodiment and the second embodiment, the motor 4 is held at the gear accommodating portion 14 that is attachable and removable with respect to the first member 1, whereas in the third embodiment, the motor holding portion 15 is formed integrally with the first member 1 as illustrated in FIG. 3. As such, the accuracy of position of the motor 4 attached to the first member 1 is determined depending on the machining accuracy of the first member 1 alone. Thus, as compared with the structure in which the motor 4 is held by the gear accommodating portion 14 attached to the first member 1 or the second member 3 as in the first embodiment or the second embodiment, it is easy to secure an accuracy of the inter-axis distance between the first gear 5 and the second gear 7. Consequently, the back lash of the driving gear portion is prevented so that the operational accuracy of the robot can be improved.

In other words, when the structural portion to which the motor 4 and the speed reducer 2 are attached is configured of a plurality of components, a problem tends to arise in which the accuracy of the inter-axis distance between the first gear 5 and the second gear 7 is affected by the dimensional accuracy of each component and the assembly accuracy between the components. In the third embodiment, no such problem occurs.

The structure of the third embodiment described above can be applied to the structure of the second embodiment (FIG. 2) as well.

In each of the embodiments described above, the illustrated form of the first member 1 or the second member 3 is a form such that the motor 4 is located inside of the first member 1 or the second member 3. However, the present invention is not limited to such form. In other words, the form of the first member 1 or the second form 3 may be a form such that the motor 4 is located outside of the first member 1 or the second member 3.

Advantage of the Invention

According to the first aspect of the present invention, the speed reducer is coupled to one surface of the wall portion of the first member. The first gear is attached to the shaft of the motor, and the motor is located at the side opposite to the one surface of the wall portion of the first member. Further, the first member is provided with the gear accommodating portion that accommodates the first gear of the motor and the second gear of the speed reducer which intermeshes therewith. The part of the gear accommodating portion which covers at least the second gear is attachable and removable with respect to the first member. Thus, by removing the part of the gear accommodating portion which covers the second gear from the first member, it is possible to remove the second gear of the speed reducer, with the speed reducer remaining coupled to the first member 1.

Further, since the part of the gear accommodating portion which covers the second gear can be removed from the first member, the attaching of the second gear can be performed, with the speed reducer being coupled to the first member. As such, it is possible to freely set the diameter of the second gear attached to the speed reducer, without taking into account of the diameter of the coupling unit of the speed reducer which allows the speed reducer to be coupled to the first member. Consequently, it is possible to set a larger speed reduction ratio using the second gear having a larger diameter than the coupling unit of the speed reducer.

Further, when the second gear having a lager diameter than the coupling unit of the speed reducer is used, it is not required to locate a coupling plate between the first member and the speed reducer as in the prior art structure illustrated in FIG. 5, so that there is no possibility that the power transmission path between the first member and the speed reducer is cut. In addition, the coupling plate and the bolts for tightly securing the coupling plate to the first member and the speed reducer would not be necessary, and therefore it is possible to prevent the component cost and the number of man-hours from increasing.

Further, when the second gear is exchanged for maintenance, it is not necessary to remove from the first member the relatively heavy speed reducer and the second member attached to the speed reducer. Since it is possible to exchange the second gear merely by removing the part of the gear accommodating portion which covers at least the second gear, the maintainability is improved.

According to another aspect of the present invention, the gear accommodating portion is formed by the cover member that covers the first gear and the second gear. Thus, it is possible to easily achieve a configuration that makes the gear accommodating portion attachable and removable with respect to the first member. In addition, when the second gear is exchanged for maintenance, the relatively light cover member is removed, and thus it is possible to easily exchange the second gear.

Further, according to another aspect of the present invention, the gear accommodating portion is configured of the motor holding portion and the cover member that covers the second gear. The cover member is removably fixed to the first member, whereas the motor holding portion is molded integrally with the first member. Thus, the accuracy of position of the motor attached to the first member is determined based on the accuracy of the first member alone. In this manner, it is easy to secure the accuracy of the inter-axis distance between the first gear of the motor and the second gear of the speed reducer, as compared with a structure in which the motor is held by a member attached to the first member. Consequently, the back lash of the driving gear portion is prevented so that the operational accuracy of the robot can be improved.

While, in the foregoing, exemplary embodiments have been illustrated, the present invention is not limited to the embodiments described above, and the embodiments described above can be modified to incorporate various shapes, structures, materials or the like without departing from the idea of the present invention.

What is claimed is:

1. A joint structure for an arm of a robot, comprising:
a first member;
a speed reducer coupled to one surface of a wall portion of the first member, a shaft of the speed reducer being passed through the wall portion;
a motor located at a side opposite to the one surface of the wall portion;
a first gear attached to a shaft of the motor;
a second gear coaxially attached to the shaft of the speed reducer and intermeshing with the first gear; and
a second member attached to the speed reducer,
wherein
the second gear has a larger diameter than a diameter of a coupling unit of the speed reducer which couples to the first member,
the first member is provided with a gear accommodating portion that accommodates the first gear and the second gear which intermesh with each other,
the gear accommodating portion is formed by a cover member covering the first gear and the second gear which intermesh with each other, and the cover member is disposed in a space of the arm of the robot, is removably fixed to the first member by a detachable fastener, and is located at a side opposite to the one surface of the wall portion, and the motor is held at the cover member.

2. The joint structure according to claim 1, wherein
the detachable fastener by which the cover member is removably fixed to the wall portion of the first member is a first fixing member,
the coupling unit of the speed reducer is coupled to the wall portion of the first member by a second fixing member, and
the strength of the first fixing member is less than that of the second fixing member.

3. The joint structure according to claim 1, wherein the second gear intermeshes directly with the first gear.

4. The joint structure according to claim 1, wherein the cover member includes:
a first portion removably fixed to an opposite surface of the wall portion of the first member by the detachable fastener, and
a second portion extending from the first portion in a direction away from the speed reducer, the second portion defining the gear accommodating portion in which the first gear and the second gear are accommodated, the motor being fixed to the second portion.

5. A joint structure for an arm of a robot, comprising:
a first member;
a speed reducer coupled to one surface of a wall portion of the first member, a shaft of the speed reducer being passed through the wall portion;
a motor located at a side opposite to the one surface of the wall portion;
a first gear attached to a shaft of the motor;
a second gear coaxially attached to the shaft of the speed reducer and intermeshing with the first gear; and
a second member attached to the speed reducer,
wherein
the second gear has a larger diameter than a diameter of a coupling unit of the speed reducer which couples to the first member,
the first member is provided with a gear accommodating portion that accommodates the first gear and the second gear which intermesh with each other, and
the gear accommodating portion comprises:
a motor holding portion formed integrally with the first member and accommodating the first gear and holding the motor; and
a cover member disposed in a space of the arm of the robot and removably fixed to the first member by a detachable fastener, and said cover member covering the second gear.

6. The joint structure according to claim 5, wherein
the detachable fastener by which the cover member is removably fixed to the wall portion of the first member is a first fixing member,
the coupling unit of the speed reducer is coupled to the wall portion of the first member by a second fixing member, and
the strength of the first fixing member is less than that of the second fixing member.

7. The joint structure according to claim 5, wherein the second gear intermeshes directly with the first gear.

* * * * *